(12) United States Patent
Kirovski et al.

(10) Patent No.: US 8,438,068 B2
(45) Date of Patent: May 7, 2013

(54) REPUTATION IN ON-LINE CONSUMER MARKETS

(75) Inventors: Darko Kirovski, Kirkland, WA (US); Ashwin Swaminathan, Greenbelt, MD (US); Renan Gonçalves Cattelan, São Paulo (BR); Varkey Cherian, Tiruvalla (IN)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 11/952,679

(22) Filed: Dec. 7, 2007

(65) Prior Publication Data

US 2009/0150296 A1    Jun. 11, 2009

(51) Int. Cl.
*G06Q 30/00* (2012.01)

(52) U.S. Cl.
USPC ........................................................ 705/26.1

(58) Field of Classification Search ............... 705/26–27
See application file for complete search history.

(56) References Cited

U.S. PATENT DOCUMENTS

| | | | |
|---|---|---|---|
| 6,574,608 B1 | 6/2003 | Dahod et al. | |
| 6,839,690 B1 | 1/2005 | Foth et al. | |
| 7,617,128 B2* | 11/2009 | Greak | 705/26.35 |
| 2003/0004855 A1 | 1/2003 | Dutta et al. | |
| 2003/0135421 A1 | 7/2003 | Cales et al. | |
| 2003/0167232 A1 | 9/2003 | Linton | |
| 2004/0128155 A1 | 7/2004 | Vaidyanathan et al. | |
| 2005/0278244 A1 | 12/2005 | Yuan | |
| 2007/0192169 A1 | 8/2007 | Herbrich et al. | |

OTHER PUBLICATIONS

Dellarocas Chrysanthos, "Reputation Mechanisms", Date: Jun. 2005, pp. 1-38.
Jurca, et al., "Obtaining Reliable Feedback for Sanctioning Reputation Mechanisms", Date: 2007, pp. 391-419.
Kerr, et al., "Towards Provably Secure Trust and Reputation Systems in E-Marketplaces", Date: May 14-18, 2007, pp. 1-3.
Kamvar, et al. "The EigenTrust Algorithm for Reputation Management in P2P Networks", Proceedings of the Twelfth International World Wide Web Conference, 2003.
Xiong., et al., "Supporting Reputation-Based Trust in Peer-to-Peer Communities", IEEE Transactions on Knowledge and Data Engineering, vol. 16, (No. 7), Jul. 2004.
Swamynathan., et al,"Reputation Management in Decentralized Networks. Technical report", University of California, Santa Barbara, 2007.

* cited by examiner

*Primary Examiner* — Jeffrey A Smith
*Assistant Examiner* — Ethan D Civan
(74) *Attorney, Agent, or Firm* — Lyon & Harr, LLP; Richard T. Lyon

(57) ABSTRACT

Seller's reputation quantification technique embodiments are presented that quantify in monetary terms a risk of dissatisfaction to a potential buyer of a product or service from a seller in an on-line consumer market. Generally, this involves computing the monetary sales limit for the seller. This monetary sales limit represents an amount, which if a sum of the current prices of all the products and services currently offered by the seller is equal to or less than the amount, there would not be a significant risk to the buyer of being dissatisfied with the product or service. Given this, a risk of a potential buyer's dissatisfaction with a product or service purchased from the seller in view of a price the buyer wants to pay is assessed. The assessed risk is then provided to the potential buyer in the form of one or more risk indicators.

20 Claims, 8 Drawing Sheets

REPUTATION IN ON-LINE CONSUMER MARKETS

BACKGROUND

The popularity of on-line consumer markets is ever increasing. However, the nature of these on-line markets requires a certain amount of trust between the participating users, i.e., between the buyers and sellers. A participant's reputation has been widely accepted as one of the most common means of establishing trust among the users. Reputation in on-line consumer markets often takes the form of counters that specify positive and negative feedback from past transactions and/or some form of transaction analysis that aims to assess the likelihood that a specific user in the network will commit a fraudulent transaction.

SUMMARY

Seller's reputation quantification technique embodiments described herein quantify in monetary terms a risk of dissatisfaction to a potential buyer of a product or service from a seller in an on-line consumer market. In one general embodiment this is accomplished by first computing the monetary sales limit for the seller. The seller's monetary sales limit can be computed by assigning a weight to each completed transaction between the seller and buyers previously purchasing a product or service from the seller. The weight assigned to each completed transaction represents at least a portion of the overhead expense incurred by the seller when the previous buyer was satisfied with the purchase (as indicated by his or her positive feedback about the transaction), and represents the negative of the amount paid by the previous buyer if the buyer was not satisfied with the purchase. The weights assigned to the completed transactions are summed, and if a reimbursement fund has been provided by the seller, the amount of the fund is added to the summed weights, to produce the monetary sales limit for the seller. This monetary sales limit represents an amount, which if a sum of the current prices of all the products and services currently offered by the seller in the on-line consumer market is equal to or less than the amount, there would not be a significant risk to the buyer of being dissatisfied with the product or service. Given this, a risk of a potential buyer's dissatisfaction with a product or service purchased from the seller in view of a price the buyer wants to pay is assessed based in part on the seller's monetary sales limit. The assessed risk of dissatisfaction is then provided to the potential buyer in the form of one or more risk indicators.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of seller's reputation quantification technique embodiments reference is made to the accompanying drawings which form a part hereof, and in which are shown, by way of illustration, specific embodiments in which the invention may be practiced. It is understood that other embodiments may be utilized and structural changes may be made without departing from the scope of the invention.

1.0 Seller's Reputation Quantification Technique

Figure 1:
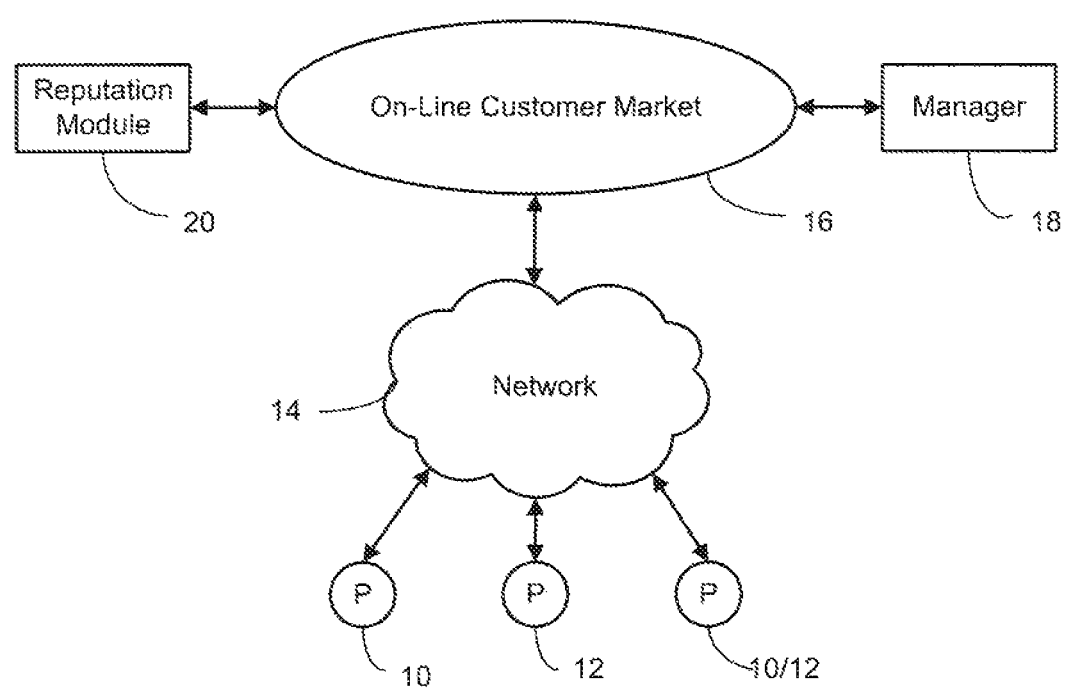
FIG. 1 is a simplified architectural diagram of an online consumer market.

Before the seller's reputation quantification technique embodiments are described, a general description of a suitable online consumer market environment in which portions thereof may be implemented will be described. Referring to the simplified architectural diagram of an online consumer market in FIG. 1, it is noted that some participants (buyers 10) buy products and services from other participants in the market, while some participants (sellers 12) sell products and services to the buyers. In addition, many participants 10/12 do both—buying and selling. The sellers 12 present their products and services to the buyer 10 over a network 14, such as the Internet. Each participant 10, 12 employs a computing device which is configured to act as a client on the network 14. Products and services are listed and purchases are mediated via an online consumer market 16. The online consumer market 16 employs one or more servers for this purpose. Typically, the online consumer market 16 collects listing fees, as well as other fees, from the sellers 12. The online consumer market 16 is controlled by an entity that will be referred to herein as the online consumer market manager 18. The manager 18 acts as a go between in that it receives payment for products and services from a buyer 10, deduct the fees owed to the market by the seller 12, and transfers the remainder to the seller. The online consumer market 16 also provides various services to the participants to facilitate commerce. Of particular note is a reputation module 20 that provides information to buyers 10 concerning the trustworthiness of a seller 12. It is noted that the products and services that the envisioned on-line consumer market trades in is intended to be quite broad. For example, the on-line market could trade in household goods, professional services, real estate, stocks and bonds, and so on.

The seller's reputation quantification technique embodiments described herein generally involve quantifying in monetary terms a risk of dissatisfaction to a potential buyer of a product or service from a seller in an on-line consumer market. More particularly, a seller's reputation is quantified with a monetary value that a consumer or business (buyer) should feel comfortable paying, knowing that by committing fraud the product or service provider (seller) still cannot make profit from its existence in the market. In this way, reputation is quantified using a deterministic economic value as opposed to a more subjective probabilistic descriptor. Even in the case of stolen identity, a seller cannot produce illegal profit unless a buyer decides to pay over the suggested sales limit, as will be described later. The sales limit of an individual seller is built using a record of transaction fees, and verifiable types of transaction costs (insurance, arbitrage, shipping, and so on). To further bolster buyer confidence, each seller can establish a reimbursement fund which is used as a guarantee that defrauded buyers will get fully or partially reimbursed. The aforementioned monetary value that is used to quantify customer reputation (which may be referred to as the seller's sales limit) allows a probabilistic strategy for risk assessment that aims at helping buyers estimate the risk of paying for a product or service over the sales limit.

Figure 2:
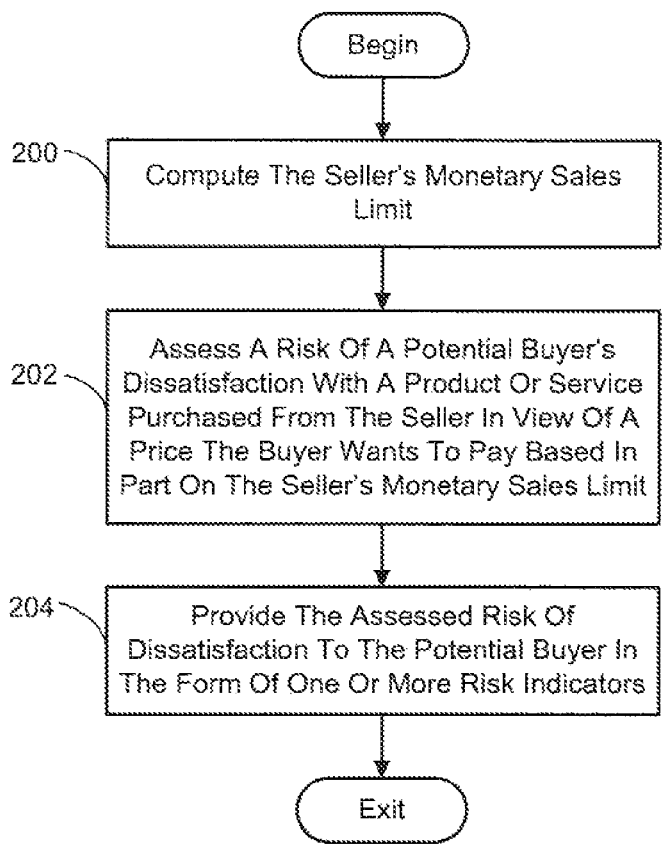
FIG. 2 is a flow diagram generally outlining one embodiment of a process for quantifying in monetary terms a risk of dissatisfaction to a potential buyer of a product or service from a seller in an on-line consumer market.

Referring to FIG. 2, in one general embodiment the foregoing is accomplished by first computing the monetary sales limit for the seller (200). This monetary sales limit represents an amount, which if a sum of the current prices of all the products and services currently offered by the seller in the on-line consumer market is equal to or less than the amount, there would not be a significant risk to the buyer of being dissatisfied with the product or service. Given this, a risk of a potential buyer's dissatisfaction with a product or service purchased from the seller in view of a price the buyer wants to pay is assessed based in part on the seller's monetary sales limit (202). The assessed risk of dissatisfaction is then provided to the potential buyer in the form of one or more risk indicators (204).

The seller's reputation quantification technique embodiments described herein have advantages that include not relying on a buyer's feedback alone to establish the seller's reputation. Thus, trivial approaches to building up a seller's positive transaction history will not be effective. For example, schemes that involve fabricating transactions with friends or non-existent consumers (e.g., established using stolen identities) will not work. Additionally, schemes that involve creating a relatively long-term honest sales behavior until a "major" fraudulent transaction fetches significant profits for the adversary will not work.

It is noted that the described seller's reputation technique embodiments complement existing on-line dispute resolution (ODR) systems, to the extent that they aim to prevent and/or handle fraudulent transactions the ODR system cannot due to seller non-cooperation. Needless to say, ODR, and insurance schemes as well, are orthogonal with respect to the described embodiments in their effect on the marketplace as they address mostly non-fraudulent disputes. Thus, for brevity and simplicity ODR and insurance schemes are not address in detail in the present description.

1.1 The On-Line Consumer Market Model

In this section, an on-line consumer market model is introduced and a two-party transaction is defined in terms of an economic function in the model. Let $C=\{c_1, \ldots, c_N\}$ be a cardinality-N set of nodes in a graph G, where each node $c_i$ models a distinct consumer. For now a transaction will be described as an exchange of economic value between a buyer and a seller. A simple transaction model will be defined later in section 1.2.2. In the case of a consumer-to-consumer (C2C) market the buyer pays using a cash equivalent for a product or service offered by the seller. In the case of a consumer-to-business (C2B) market for job outsourcing, the seller (workforce) commits to performing a task set by the buyer (employer) with an agreed compensation using a cash equivalent. Any node in the graph can be a buyer or a seller in a transaction.

A committed transaction $t(c_i, c_j)$ between a buyer $c_i$ and a seller $c_j$ is defined as a weighted directed edge $c_i \rightarrow c_j$ where the weight $w(c_i, c_j) \equiv w_{ij}$ is a real non-zero scalar such that:

$w_{ij} > 0$: the transaction was executed to the satisfaction of the buyer with $w_{ij}$ equal to the transaction costs; and $w_{ij} < 0$: the transaction was not to the satisfaction of the buyer with $-w_{ij}$ proportional to the cash equivalent paid by the buyer.

Denote T and W as the sets of all edges and their weights in the market graph G, respectively. The pending transactions are then modeled in the network as a set $P=\{p_1, \ldots, p_N\}$ of arrays of values available for sale at corresponding nodes. A transaction is pending until its buyer and seller reach a closure on their satisfaction with the transaction; then the transaction becomes committed. An array $p_i = \{p_1, \ldots p_{Li}\}$ is a list of $L_i$ values associated with the products or services that seller $c_i$ is currently offering for sale. It is allowed that products' prices can form using an arbitrary negotiation mechanism. Each individual price, $p_k$, is formed as an asking price (if the seller does not have a buyer yet) or as a winning bid (in case there exists an arbitrary auctioning mechanism). In order for a buyer to learn about a specific product sold by any seller, arbitrary marketing strategies are also allowed in the model.

Thus, the final model of the considered on-line consumer market includes the directed weighted graph G(C, P, T, W), where pending transactions are still under negotiations. A seller's reputation quantification technique in accordance with this model will be described in the sections to follow.

1.2 Reputation Quantifiers

In general, the seller's reputation quantification technique embodiments described herein are designed to provide reputation quantifiers indicating the risk to a potential buyer in doing business with a seller. In some embodiments, the reputation quantifiers used to model a seller's reputation take the form of two monetary values: a sales limit and a reimbursement fund. These values allow a buyer to use deterministic pricing tactics that cannot profit the seller in case of a fraudulent transaction, thereby minimizing the possibility that a seller will defraud the buyer.

The sales limit $\alpha_i$ can be generally defined for a specific user $c_i$ in an on-line consumer market as an upper bound on pricing $p_i$ such that if $c_i$ commits fraud on each item offered in $p_i$, he or she can still not profit from an existence in the market as a consumer. In view of this, $\alpha_i$ can be set such that $c_i$ could not make profit if:

$$\sum_{\forall p_j \in p_i} p_j \leq \alpha_i \tag{1}$$

The reimbursement fund $\beta_i$ can be generally defined for a specific user $c_i$ in an on-line consumer market as a sum of money that can be used to offset losses to buyers who participate in pending transactions with $c_i$ in case $c_i$ commits fraud. In the seller's reputation quantification technique embodiments described herein, each seller $c_i$ chooses the value of $\beta_i$ according to his or her required selling power. In general, consumers feel comfortable bidding to products from $c_i$ knowing that any fraud would get fully reimbursed if pricing is such that:

$$\sum_{\forall p_j \in p_i} p_j \leq \beta_i \tag{2}$$

It is noted that if pricing on $p_i$ is over $\beta_i$ and fraud is committed with losses greater than $\beta_i$, a first-in first-out (FIFO) scheme is one possible fair method for using the reimbursement fund among the defrauded consumers. The reimbursement fund can be established as an insurance policy as well. In addition, any funds held by the escrow could be potentially invested.

1.2.1 Risk Taking

In the seller's reputation quantification technique embodiments described herein, a buyer could get defrauded if he or she chooses to pay a price that sets $\Sigma_{\forall p_j \in p_i} p_j$ over the reimbursement fund. However, the buyer is unlikely to encounter a fraudulent seller as long as he or she chooses to pay below seller's sales limit. Although the seller could defraud such a buyer, the seller would still not gain any substantial profit—hence it is unlikely to expect that a malicious party would build the reputation of a fabricated user with little prospects of profit in the market.

1.2.2 The Transaction Model

The proposed reputation quantifier $\alpha_i$ is computed based upon a consumer's prior transaction record. It is used to provide guarantees to prospective buyers when the consumer is selling a product or service in the on-line consumer market. In order to compute $\alpha_i$, a simple transaction model is adopted. The transaction costs are reviewed first. The cost of an individual transaction $C_t = C_p + C_m + C_h$, paid by the buyer, is composed of three entities:

(a) a product price, $C_p$, which represents the total amount of money after all costs received by the seller;

(b) a manager fee, $C_m$, is paid to the mediator in the transaction (e.g., a manager of an on-line consumer market), and (c) a miscellaneous fee, $C_h$, which includes other fees such as: arbitration insurance, shipping and handling, taxes, and so on. The on-line consumer market manager may orchestrate some of these activities. All miscellaneous fees that can be verified by a trusted party (e.g., the manager) are used to establish participants' sales limits.

Figure 3:
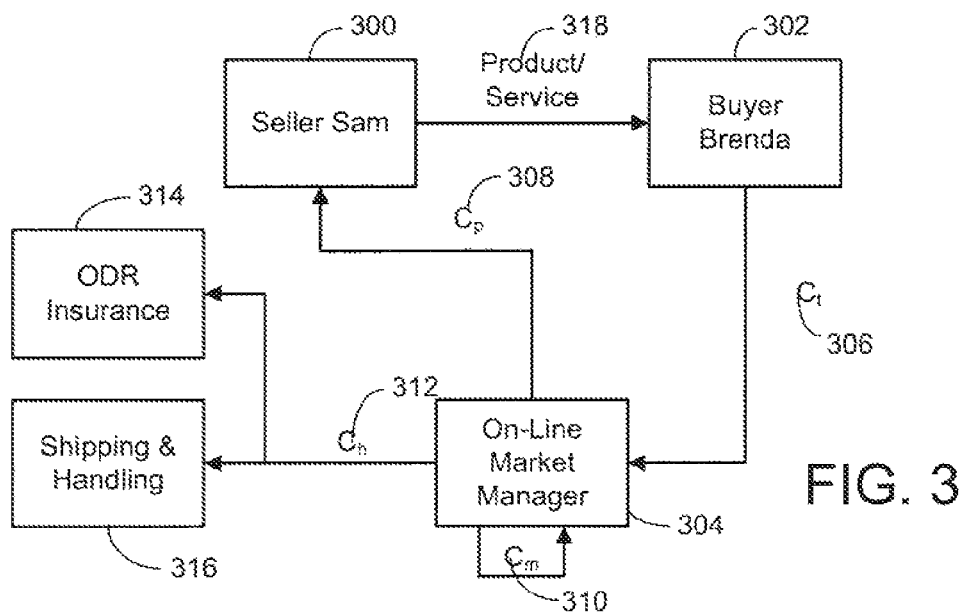
FIG. 3 is a diagram modeling a transaction between a seller and a buyer in an on-line consumer market showing the entities and costs involved.

Referring to FIG. 3, a transaction between a seller 300, Sam, and a buyer 302, Brenda is modeled. Once the negotiation process has completed, Brenda 302 pays to Sam 300 via the on-line consumer market manager 304 the amount due 306, $C_t$. After receiving the payment, the manager 304 updates the accounts of all parties involved. More particularly, Sam 300 receives payment $C_p$ 308 which reflects the deduction of $C_m$ 310 and $C_h$ 312, Brenda 302 is billed, ODR insurance 314 is paid, shipping and handling 316 is paid, and so on). Next, Sam is now required to deliver the product 318 to Brenda. Here is a list of considered outcomes upon merchandise delivery (or failure to):

{P} positive feedback—Brenda is satisfied with the outcome of the transaction.

{N} negative feedback—Brenda is dissatisfied with the received product or service, or does not receive the product or service; the participants in the transaction decide to resolve the situation as follows:

{N.1} no refund—Sam accepts negative feedback and Brenda does not initiate the refund process. This would be typical for a transaction with low $C_p$.

{N.2} refund—Sam agrees to refund Brenda. If the issue is closed to Brenda's satisfaction, the transaction record is deleted including Sam's negative feedback.

{N.3} dispute—occurs in all other cases. This is the most interesting case, as it involves arbitration and resources for refunding the plaintiff.

1.2.3 Computing the Reputation Quantifiers

In this section, computation of the reputation quantifiers for each of the previously described outcomes is considered.

Case {P}. For the purposes of the following description it will be assumed that for a specific completed transaction $t(c_B, c_S)$ all transaction overhead costs, $C_o = C_t - C_p$, can be attributed to the seller, or both the buyer and the seller. In addition, it will be assumed that all miscellaneous costs can be verified by the on-line consumer market manager. This last assumption may not always be true—for example, shipping costs, if not paid for via a manager's payment system typically cannot be provably verified. The manager would subtract expenses that cannot be verified from $C_o$ before applying them to the seller's (and buyer's as will be seen) reputation quantifiers.

In one embodiment, a stance is taken that the buyer pays a fair market price for the product that includes $C_o$ and that the seller is the one paying for transaction costs. In such a setting, after each committed transaction, the seller's sales limit increment due to a transaction t equals:

$$\alpha_S(t(c_B, c_S)) = w_{BS} = C_o \tag{3}$$

In general, $C_o$ is the "loss" that the seller has with respect to fair market price. In another embodiment, the buyer and the seller could negotiate a shared application of the transaction cost during negotiation. This sets up a more general case for computing sales limits:

$$\alpha_S(t(c_B, c_S)) = w_{BS} = \partial C_o, \tag{4}$$

$$\alpha_B(t(c_S, c_B)) = w_{SB} = (1-\partial) C_o, \tag{5}$$

where $0 \leq \partial \leq 1$ is a parameter that scales the application of costs to the buyer's and seller's sales limits. Note that in this case, an edge $t(c_S, c_B)$ directed $c_S \rightarrow c_B$ is added to T with an appropriate weight factor.

Case {N.1}. Only the seller's reputation is affected by this case. Here, the seller's sales limit is reduced by:

$$\alpha_S(t(c_B, c_S)) = w_{BS} = -C_p, \tag{6}$$

if the on-line consumer market manager can verify all miscellaneous costs. If this is not the case, all non-verified costs are also subtracted from the seller's sales limit.

Case {N.3}. Disputes in on-line transactions are typically resolved using the on-line consumer market manager's or a third party's ODR systems. Costs related to ODR are included in $C_h$ as insurance against this outcome. Possible outcomes for the ODR process are:

(a) resolution in favor of one of the participants in the transaction; then this case is resolved as {P}, {N.1}, or {N.2} with respect to the sales limit.

(b) impasse; a bargaining impasse occurs when the two sides are unable to reach an agreement and become deadlocked. This situation is difficult to handle because possible solutions can hurt the party who is innocent.

Certainly, entities who plan on participating in a transaction with either $c_S$ or $c_B$ should know that they have been involved in this dispute. As long as the dispute is in impasse, the seller's sales limit is affected as defined in case {N.1}, and the buyer's record shows participation in a deadlocked dispute.

(c) lack of co-operation in the ODR process by the seller, $c_S$; typically a consequence of fraud. Such an outcome of a transaction would reduce the sales limit of $c_S$ as defined in case {N.1}.

The overall sales limit for a specific consumer, $c_i$, is then computed as follows:

$$\alpha_i = \sum_{\forall t_{(c_j, c_i)} \in T_i} w_{ji} + \beta_i \qquad (7)$$

where $T_i$ is a subset of all edges in T with $c_i$ as a destination.

Equation (7) includes the reimbursement fund, $\beta_i$, that $c_i$ establishes to insure customers from potential fraud. Typically, a new seller would deposit a specific amount $\beta_i(0)$ into its account with the on-line consumer market manager to start up its reputation, i.e., an initial sales limit of $\alpha_i(0) = p_i(0)$. Succeeding sales would establish its sales limit. Then, $c_i$ can balance the value of its reimbursement fund (this fund can be lowered or increased on-demand) and thus adjust its sales limit, to achieve a desirable selling power.

Figure 4:
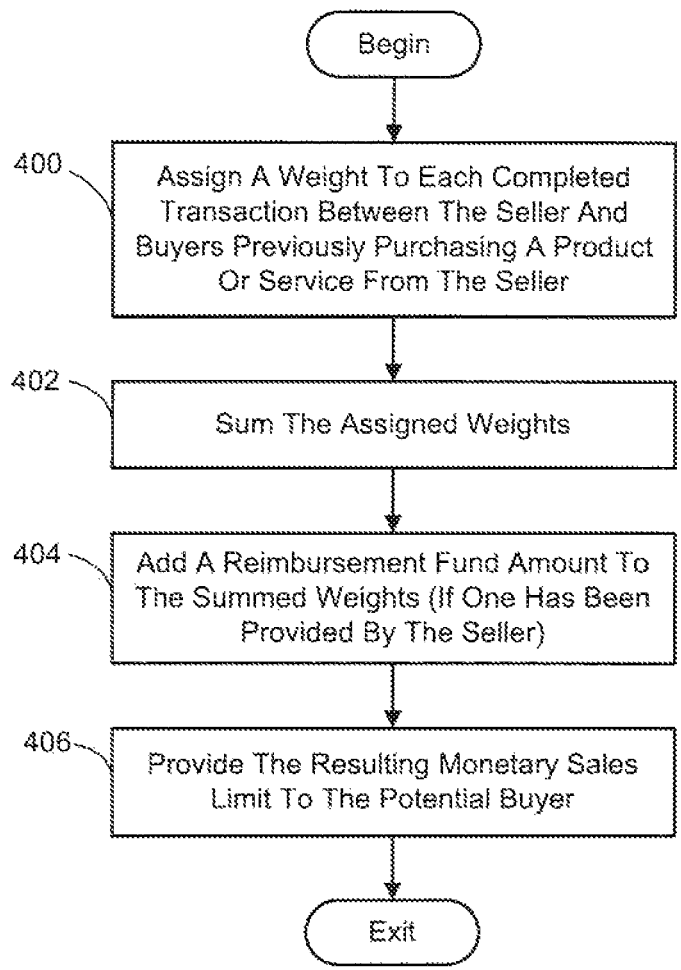
FIG. 4 is a flow diagram outlining an implementation of the part of the process of FIG. 2 involving the computation of a seller's sales limit and providing a potential buyer with the limit.

Referring to FIG. 4, one implementation of the foregoing embodiments for computing the aforementioned seller's sales limit and providing a potential buyer of a product or service from a seller in an on-line consumer market with the limit, involves first assigning a weight to each completed transaction between the seller and buyers previously purchasing a product or service from the seller (400). As indicated previously, the weight assigned to each completed transaction represents at least a portion of the overhead expense incurred by the seller when the previous buyer was satisfied with the purchase (as indicated by his or her positive feedback about the transaction), and represents the negative of the amount paid by the previous buyer if the buyer was not satisfied with the purchase. The weights assigned to the completed transactions are then summed (402), and if a reimbursement fund has been provided by the seller the amount of the fund is added to the summed weights (404), to produce a monetary sales limit for the seller. The monetary sales limit figure is then provided to the potential buyer (406). The potential buyer will use the limit in assessing a risk of dissatisfaction with the purchase of a product or service from the seller in view of a price the buyer wants to pay, as will be described in more detail in the sections to follow.

It is noted that in an embodiment where the overhead costs of a transaction are shared between the seller and a buyer as described above, the foregoing process includes considering the portion of the overhead costs of a transaction paid by a buyer, who subsequently is a seller in the on-line consumer market, in the computation of the seller's sales limit. More particularly, a weight is assigned to the completed transaction between the seller acting as a buyer in a previous transaction and another seller in the on-line consumer market. As before this weight represents the portion of the overhead costs incurred by the buyer (who is now acting as a seller) from the previous transaction. These weights are then summed along with all the other assigned transaction weights associated with the seller.

In some circumstances it is possible that the overhead costs associated with a transaction in an on-line consumer market might exceed the costs of selling the same product or service outside the on-line marketplace. This situation might increase the risk of seller fraud even though the seller's monetary sales limit equals or exceeds the sum of the current pricing of all items being offered by the seller in the on-line market. Given this, in one embodiment the overhead costs $C_o$ would be reduced by a factor that makes them match the overhead costs associated with the outside marketplace. Thus, the seller's monetary sales limit would be reduced by an amount that would make defrauding a buyer unprofitable.

1.2.4 Bidding

When a buyer, $c_B$, aims to bid for an item sold by $c_S$, one embodiment presents several quantifiers to $c_B$: $\alpha_S$, $\beta_S$, and the current pricing of all items being offered by $c_S$: $\pi_S = \Sigma_{\forall p_i \in p_S} p_i$. Based upon these quantifiers, $c_B$ can decide upon the risk he or she is willing to take when bidding on an item sold by $c_S$ that would increase the total price of the offering to $\pi_{new}$. For example, if $\pi_{new} > \alpha_S$, $c_B$ can ask $c_S$ to increase his or her as by increasing his reimbursement fund so that $c_B$ can bid comfortably knowing that $c_S$ cannot make profits in case he or she decides never to deliver the product or service. Similarly, $c_S$ can eliminate any risk in his or her bid by asking $c_B$ to set $\beta_S = \pi_{new}$.

1.3 Time-Sharing Sales Limits

On-line consumer markets usually consist of a few users who are predominantly sellers and the remaining majority of users who are predominantly buyers. Given this, an alternate seller's reputation quantification technique embodiment could be implemented with an objective to enable consumers to establish higher (up to twice as large) sales limits at a risk. Higher sales limits translate to increased selling power, hence higher profits for everyone involved.

Here, for a specific executed {P}-transaction $t(c_B, c_S)$, $c_B$ and $c_S$ create an agreement to distribute the costs of t, $C_o(t)$, on-demand so that at any time:

$$\alpha_B(t) + \alpha_S(t) = C_o(t); \qquad (8)$$

where $\alpha_X(t)$ denotes a portion of the verifiable cost $C_o(t)$ for transaction t, that is used to build up the sales limit $\alpha_X = \Sigma \forall t \in T_X \alpha_X(t)$ of $c_X$. User $c_X$ participated in t either as a buyer or as a seller.

Under the agreement, if at a specific moment, only one of the participants in t, say $c_B$, is selling an item then $\alpha_B(t) = C_o(t)$, $\alpha_S(t) = 0$. Note that this flexibility comes at risk for $c_S$. If $c_B$ commits a fraudulent transaction and his or her sales limit gets affected while using more than $\frac{1}{2}C_o(t)$ to boost $\alpha_B$, the reduction in his or her sales limit may proportionally, and possibly entirely, reduce the amount $C_o(t)$ shared by the two parties and thus, affect $\alpha_S(t)$ according to Eq. (8). Consequently, when committing to t with time-shared costs, both participants agree to take on this risk. Since on-line consumer markets typically offer preventive services against fraud, it is anticipated that this risk is low and worth the increased selling power—in particular for new or infrequent users.

1.3.1 Sales Limit Computation

How $c_B$ and $c_S$ time-share the transaction cost $C_o(t)$ will now be described. When a prospective buyer $c_D$ wants to know the sales limit of $c_B$, it is computed as follows:

$$\alpha_B = \beta_B + \sum_{\forall t \in T_B} \alpha_B(t), \qquad (9)$$

where $\alpha_B(t)$ is "grown" as much as possible within each {P}-transaction t in $T_B$ with time-sharing of sales limits. The costs of the remaining transactions within $T_B$ are accumulated as defined in section 1.2.3. For a specific {P}-transaction with a time-sharing cost $t \in T_B$, the following two scalars are computed for the other participant of t, $c_S$:

$$\pi_S = \sum_{\forall p \in p_S} p_i \quad (10)$$

$$\overline{\alpha_S} = \sum_{\forall q \in T_S-t} \begin{cases} \min\left[\frac{1}{2}C_o(q), \alpha_S(q)\right], & q \text{ is } \{P\} \\ \alpha_S(q), & \text{else} \end{cases}$$

Quantifier $\overline{\alpha_s}$ represents the lower bound on the sum of transaction costs for all transactions except q, that $c_S$ can currently use (based upon the sales activity of its neighbors with whom $c_S$ has committed {P}-transactions with time-sharing of sales limits) to build up its sales limit. Note that each participant in a {P}-transaction q, is guaranteed to receive on-demand at least one half of $C_o(q)$ regardless of the marketing activity of the other participant.

A simple technique of complexity O(d) (where d is the average degree of a node in G) is proposed for computing the maximum $\alpha_B(t)$ that $c_B$ can report to $c_D$ at a certain moment:

$$\alpha_B(t) = \begin{cases} C_o(t), & \pi_S - \overline{\alpha_S} \leq 0 \\ \frac{1}{2}C_o(t), & \pi_S - \overline{\alpha_S} \geq \frac{C_o(t)}{2} \\ \frac{1}{2}C_o(t) - [\pi_S - \overline{\alpha_S}], & \text{else} \end{cases} \quad (11)$$

Although this does not maximize $\alpha_B(t)$ with respect to a given sales activity in the market graph, it is simple, local, and therefore, fast in a large network.

1.3.2 Bidding with Time-Sharing of Sales Limits

Once $\alpha_B = \sum_{\forall t \in T_B} \alpha_B(t)$ is computed based on Eq. (11), assume $c_D$ desires to see whether a specific bid could be supported by the sales limit of $c_B$ using its time-shared costs. The new bid for a product or service offered by $c_B$ could result in:

(a) $\pi_B \leq \alpha_B$ in which case there exists no need to adjust the usage ratios in time-shared transactions committed by $c_B$; or (b) $\pi_B > \alpha_B$, which would result in adjustments to the usage ratios in time-shared transactions committed by $c_B$ so that as much as possible of the new pricing $\pi_B$ is covered by the updated sales limit $\alpha'_B$.

The sales limit adjustment is done as follows. Denote as $T'_B$ the set of committed transactions where $c_B$ is a seller with time-sharing. The difference $\delta = \pi_B - \sum_{t \in T_B - T'_B} \alpha_B(t)$ totals the amount that should be collected, i.e., withdrawn from $\alpha_X(t(c_X, c_B))$ and assigned to $\alpha_B(t(c_X, c_B))$ for $t \in T'_B$, from the shared transaction costs in $T'_B$ with minimal invasion of current sharing ratios of these transactions and thus, current sales limits of neighboring nodes. First, $\delta$ is collected uniformly from the unused part of the time-shared costs across $T'_B$. If the collected amount is not sufficient to cover $\pi_B$, the collecting continues uniformly from under-used (i.e., used less than $\frac{1}{2}C_o(q)$) costs in all $T'_B$ transactions until at least $\frac{1}{2}C_o(q)$ is used within each time-shared transaction q.

This way, $c_B$ can use at least $$\alpha_B \geq \frac{1}{2} \sum_{\forall q \in T'_B} C_o(q) + \sum_{\forall r \in T-T'_B} C_o(r)$$

and at most $\alpha_B \leq \sum_{\forall q \in T_B} C_o(q)$ as a sales limit, a potentially substantial improvement compared to the risk-free sales limit computed according to Eq. (7).

It is important to stress that while collecting credits from under-used transaction costs, $c_B$ causes other participants in these transactions to re-adjust their sales limits using the same procedure. Sales limit re-adjustments should be propagated throughout the entire market graph and may cause a reduction of sales limits of many users. Due to the sparse nature of the market graph, the propagation typically affects only nodes in the nearest neighborhood of the analyzed node. A user whose sales limit has been reduced below the sum of offers to his or her products or services must either: deposit additional funds, cancel certain bids, or hope that a buyer will pay over the sales limit. His or her candidate buyers could also bid conditionally, so that no purchase is finalized without an appropriate sales limit or reimbursement fund.

In order to prevent data races, simple but reliable locking of sales limits can be used. Although globally thousands of transactions could be occurring, locally, with respect to the neighborhood of a single user, it is unlikely that a race occurs and affects transaction integrity.

1.3.3 Fraud

Consider the case when transaction $z(c_D, c_B)$ ends up being fraudulent with the fraud committed by the seller, $c_B$. Then, first an edge between $c_D$ and $c_B$ is added with a negative weight equal to max $[-\Sigma_{t \in T-T'_B}\alpha_B(t), -C_p(z)]$. If $\delta_2 = C_p(z) - \Sigma_{t \in T-T'_B}\alpha_B(t) > 0$, then the remainder of the fraud cost $\delta_2$, is subtracted uniformly from the time-shared costs, i.e., edge weights, of all transactions in $T'_B$. As a consequence, all users in $T'_B$ suffer lowered sales limits.

1.3.4 An Example

Figure 5:
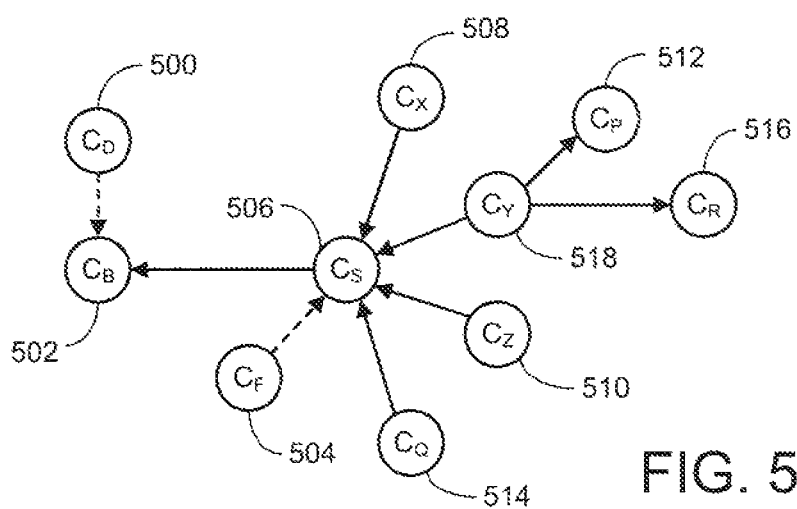
FIG. 5 is a diagram illustrating exemplary relationships between a group of participants in an on-line consumer market.

Consider the example in FIG. 5. User $c_D$ 500 wants to bid on an item sold by $c_B$ 502, and CF 504 wants to buy from $c_S$ 506. All prior transactions in the example (shown as solid lines between users) have been done using time-shared costs and with unit cost $C_o=1$. Users $c_X$ 508, $c_Z$ 510, $c_P$ 512, $c_Q$ 514 and $c_R$ 516 are not currently selling anything. Given $\Sigma p_Y = 2.75$, $\Sigma p_S = 2$, and $\Sigma p_B = 0.25$, and since $c_S$ 506 can use the time-share costs with non-selling neighboring nodes, this means $\alpha_S = 4$ and $\alpha_B = 1$. The first bid is presented by $c_F$ 504 to $c_S$ 506 at 4 units. Since $\alpha_S = 4$ this offer is handled by its sales limit. Next, $c_D$ 500 offers 0.5 to $c_B$ 502. This results in a redistribution of 0.25 from $c_S$ 506 to $c_B$ 502 to achieve $\alpha_B = 0.5$. A further redistribution of 0.25 from $c_Y$ 518 to $c_S$ 506 to preserve $\alpha_S$ occurs, and reduces $\alpha_Y = 2.5$. This causes its buyers to demand that $c_Y$ 518 deposit an additional 0.25 to fulfill the required sales limit. Upon this action, all transactions can execute.

1.3.5 An Implementation

Figure 6A:
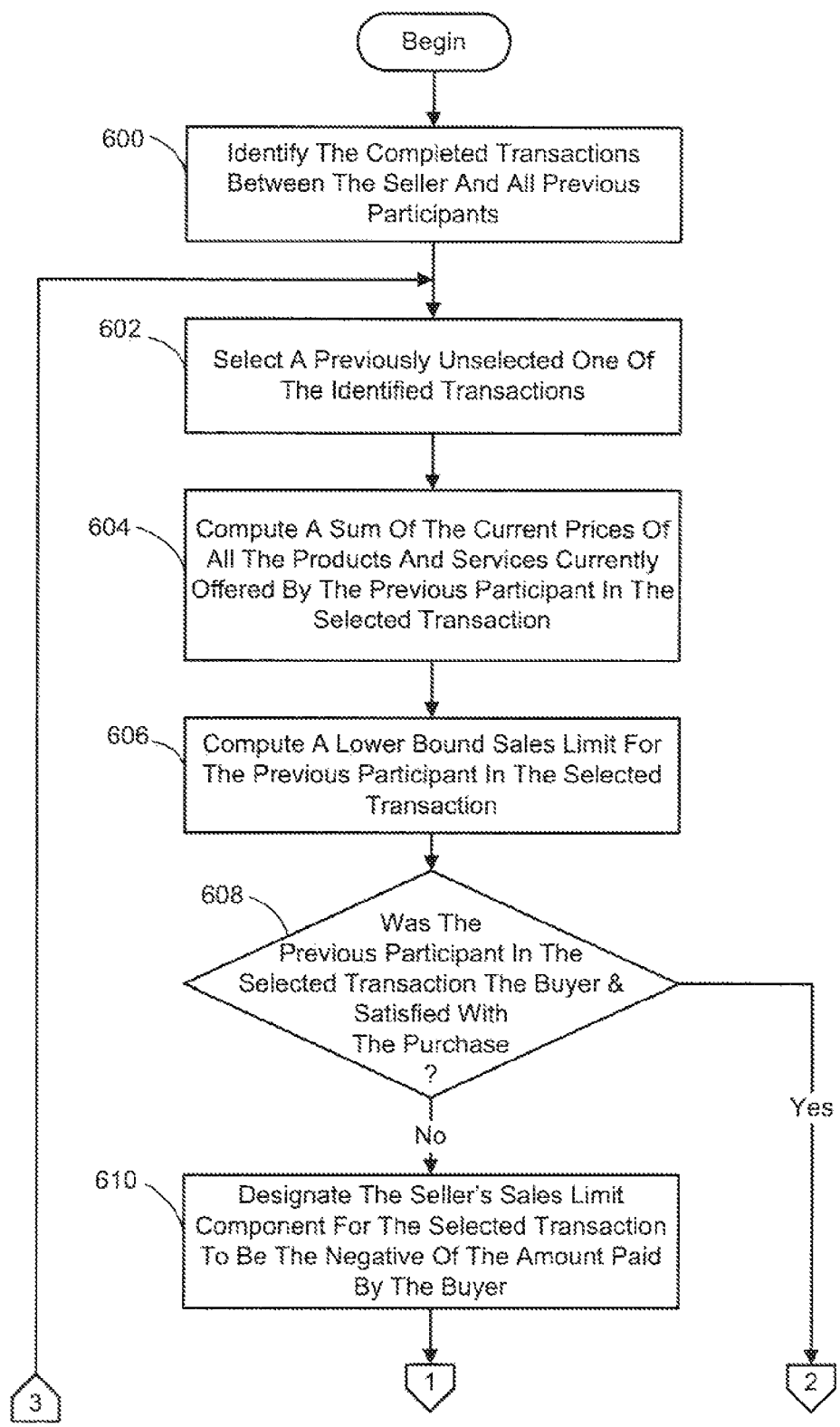
FIGS. 6A-C are a continuing flow diagram generally outlining an implementation of the part of the process of FIG. 2 involving the computation of a seller's sales limit for the case where at least some of transaction costs are time-shared and providing a potential buyer with the limit.
Figure 6B:
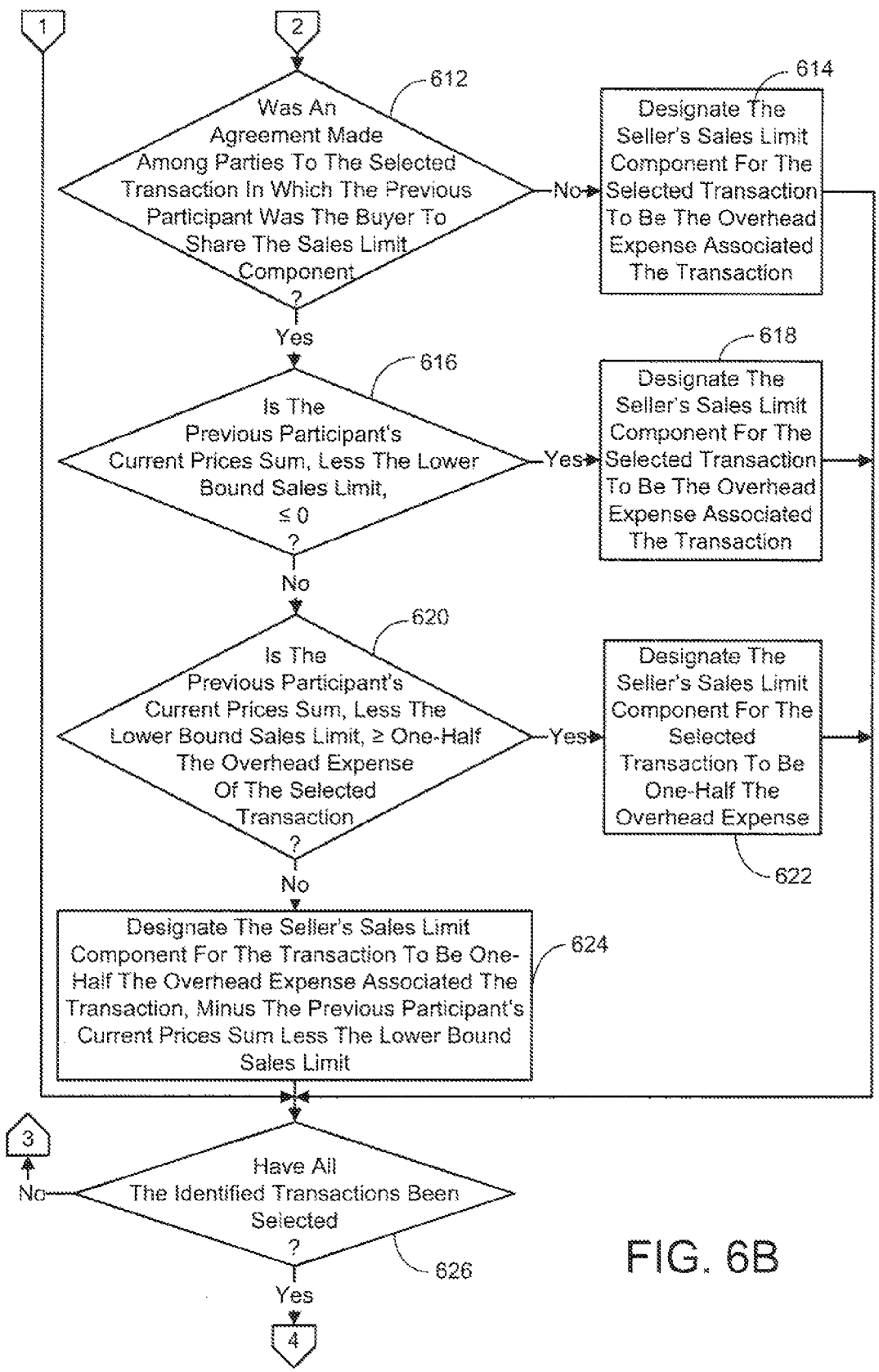
Figure 6C:
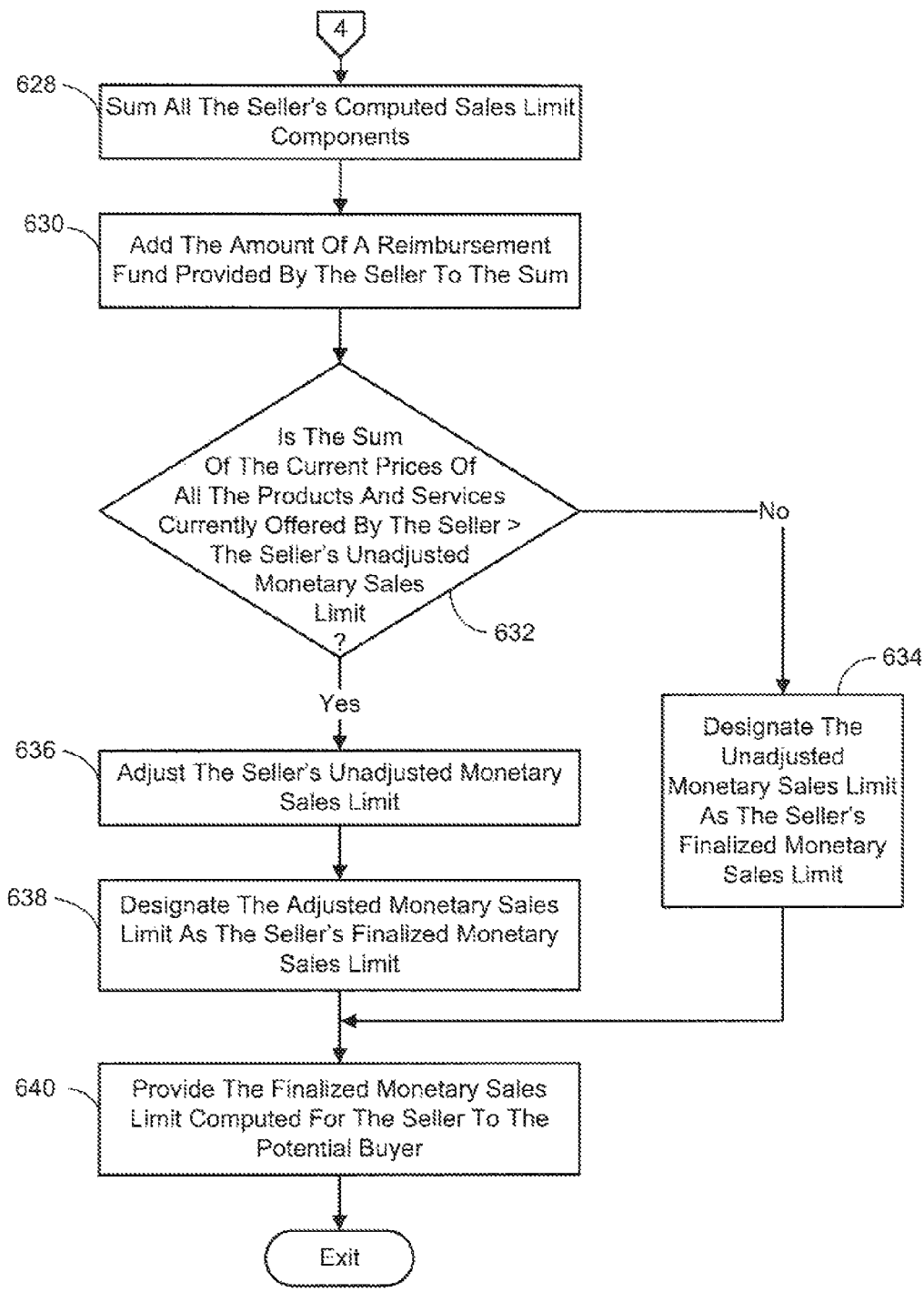

Referring to FIGS. 6A-C, one implementation of the foregoing embodiments to compute the aforementioned seller's sales limit and provide a potential buyer with the limit is described for the case where at least some transaction costs are time-shared. In this implementation, first all the completed transactions between the seller and each previous on-line market participant are identified (600). This includes transactions where the seller purchased a product or service from another seller, and where the seller sold a product or service to a buyer. A previously unselected one of the identified transactions is then selected (602). A sum of the current prices of all the products and services currently offered by the previous participant in the selected transaction is then computed (604), as is a lower bound sales limit (606). As described previously, the lower bound sales limit is computed from all the transactions (except the one under consideration) in which the previous participant in the selected transaction was a party and in which an agreement was made among the parties involved to share the sales limit component associated therewith. The lower bound sales limit represents the sum of:

the lesser of one-half of an overhead expense associated the selected transaction and a currently available portion of the overhead expense associated with the transaction, if the buyer in the selected transaction was satisfied with the purchase, and the negative of the amount paid by the buyer when the buyer was not satisfied with the purchase.

Once the current prices sum and the lower sales limit associated with the previous participant in the selected transaction have been computed, it is next determined if the previous participant is the buyer in the selected transaction and was satisfied with the purchase (608). If not, the seller's sales limit component for the selected transaction is designated as the negative of the amount paid by the buyer (610). If, however, the previous participant is the buyer in the selected transaction and the buyer was satisfied with the purchase, it is determined if an agreement was made among the parties involved in the selected transaction to share the sales limit component (612). If not, then the seller's sales limit component for the selected transaction is designated to be the overhead expense associated the transaction (614). However, if the agreement was made, then it is determined if the previous participant's current prices sum, less the lower bound sales limit, is less than or equal to zero (616). If it is, the seller's sales limit component for the selected transaction is designated to be the overhead expense associated the transaction (618). If not, then it is determined if the previous participant's current prices sum, less the lower bound sales limit, is greater than or equal to one-half the overhead expense associated the selected transaction (620). In this case if it is, the seller's sales limit component for the selected transaction is designated to be one-half the overhead expense associated therewith (622). If not, then the previous participant's current prices sum, less the lower bound sales limit, must be greater than zero and less than one-half the overhead expense associated the transaction under consideration. In such a case, the seller's sales limit component for the transaction is designated to be one-half the overhead expense associated the transaction, minus the previous participant's current prices sum less the lower bound sales limit (624).

It is next determined if all the identified transactions have been selected and processed (626). If not, actions 602 through 626 are repeated. Once all the identified transactions have been selected and processed, all the seller's computed sales limit components are summed (628) and the amount of a reimbursement fund provided by the seller is added to the sum (630). This establishes an unadjusted monetary sales limit for the seller. It is next determined if a sum of the current prices of all the products and services currently offered by the seller in the on-line consumer market is greater than the seller's unadjusted monetary sales limit (632). If not, the unadjusted monetary sales limit is designated as the seller's finalized monetary sales limit (634), and provided to the potential buyer (640). If it is, the seller's unadjusted monetary sales limit is adjusted (636). This adjustment generally entails adding unused monetary sales limit amounts currently available from previous participants in the on-line consumer market to whom the seller either previously purchased a product or service from or sold a product or service to and with whom the seller has an agreement to share a sales limit component associated with the purchase or sale, until the seller's current prices sum is less than or equal to the seller's adjusted monetary sales limit or all the currently available unused monetary sales limit amounts are exhausted. The adjusted monetary sales limit is then designated as the seller's finalized monetary sales limit (638).

The finalized monetary sales limit computed for the seller is provided to the potential buyer (640), and the implementation ends. As in other described embodiments, the potential buyer will use the limit in assessing a risk of dissatisfaction with the purchase of a product or service from the seller in view of a price the buyer wants to pay.

Figure 7:
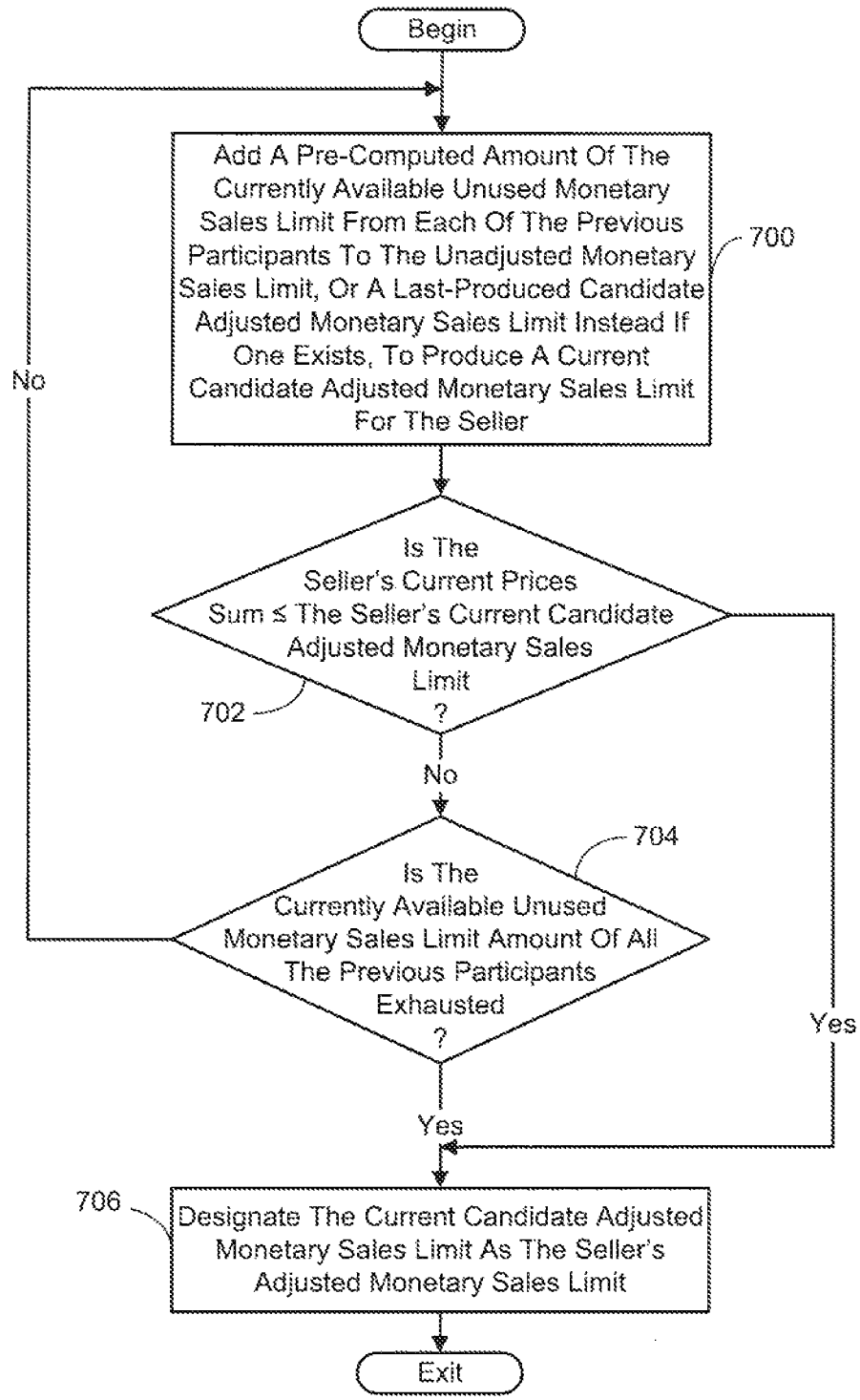
FIG. 7 is a flow diagram generally outlining an implementation of the part of the process of FIG. 6 involving the adjustment of the seller's unadjusted monetary sales limit.

In regard to the aforementioned adjustment of the seller's unadjusted monetary sales limit, in one embodiment this is accomplished in a uniform and incremental manner as indicated previously. One implementation of this is as follows. Referring to FIG. 7, a pre-computed amount of the currently available unused monetary sales limit from each of the previous participants is added to the unadjusted monetary sales limit, or a last-produced candidate adjusted monetary sales limit instead if one exists, to produce a current candidate adjusted monetary sales limit for the seller (700). It is then determined if the seller's current prices sum is less than or equal to the seller's current candidate adjusted monetary sales limit (702). In addition, it is determined if the currently available unused monetary sales limit amount of all the previous participants is exhausted (704). Whenever it is determined that the seller's current prices sum is not less than or equal to the seller's current candidate adjusted monetary sales limit, and the currently available unused monetary sales limit amount of all the previous participants is not yet exhausted, then action 700 through 704 are repeated. However, if it is determined that either the seller's current prices sum is less than or equal to the seller's current candidate adjusted monetary sales limit, or the currently available unused monetary sales limit amount of all the previous participants is exhausted, then the current candidate adjusted monetary sales limit is designated as the seller's adjusted monetary sales limit (706).

1.4 Seller's Fraud Model

One disadvantage of deterministic reputation is the conformation towards the worst case. Since fraud is costly but still not frequent, it is believed that risk assessment technologies are still of value—in particular when bootstrapping the economic activity in an on-line consumer market.

For instance, consider the scenario when a buyer, $c_B$, aims to bid for an item sold by $c_S$. In this case, the model presented previously provides guarantees to $c_B$, and as long as the price he or she offers satisfies $\pi_S \leq \beta_S$, $c_B$ cannot be defrauded. If $\pi_S > \beta_S$, $c_B$ can ask $c_S$ to increase his or her reimbursement fund. However, if $c_S$ does not have the resources necessary to increase his reimbursement fund, $c_B$ may not be willing to place a higher bid due to an increased likelihood of fraud. Such a scenario may end up in a bargaining impasse which is, on the average, a loss for all participants in the market.

In order to facilitate bargaining through risk assessment, one implementation of the seller's reputation quantification technique embodiments described herein includes an additional aspect referred to as the seller's fraud model. The seller's fraud model is generally defined as a probability $\gamma_S(p_S)$ that a seller $c_S$ decides to defraud his or her current buyers based upon the pricing $p_S$ of the product or services $c_S$ is currently offering. The model is quantified using a function f( ):

$$\gamma_S(p_S) = Pr[c_S \text{ commits fraud} | p_S] \qquad (12)$$
$$= f(\pi_S - \alpha_S) = f\left[\sum_{p_i \in p_S} p_i - \alpha_S\right]$$

over the profit that $c_S$ would create if he or she would disappear from the market after charging for all listed products.

Before bidding for a product at a certain price, the buyer would be presented with a model that estimates the probability of a fraudulent transaction given the current offering of the seller and its pricing. The tool would offer normalized risk assessment based upon f( ) trained on empirical market data. There exist numerous possibilities for creating efficient user interfaces to deliver the resulting probability. For example, a buyer could enter considered price into an HTML form field to observe the probability in question using a graphical display such as a pointer to a log γ-scale. In other embodiments, the buyer could be presented with a series of indicators, such as icons, which would indicate the level of risk in view of the buyer's proposed price. For example, a first indicator could be presented in response to a proposed bid that indicates the price would be fully refundable via the seller's reimbursement fund—and so there is no real risk in the bid. A second indicator could be presented which provides the maximum reimbursable amount the buyer could get when his or her bid exceeds the reimbursement fund. In yet another embodiment, the risk indicators presented to a buyer in response to a proposed bid could provide a visual indication of the risk level. For example, a color code scheme could be used where for instance a green indicator means there is little of no risk in the proposed bid. This could correspond to the case where $\pi_S \leq \beta_S$ or $\pi_S \leq \alpha_S$. A yellow indicator could identify a higher risk, with orange and red indicators indicating even higher risks, respectively. These would indicate risks levels further up the seller's fraud model curve.

Figure 8:
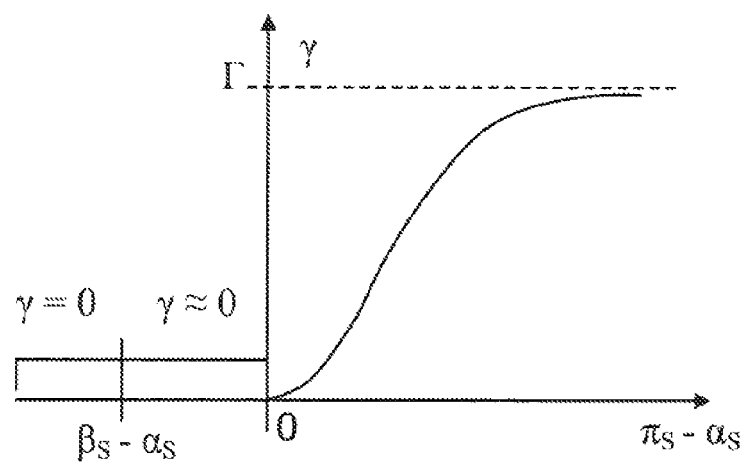
FIG. 8 is a graph showing an example of a possible seller's fraud model.

An example of an expected γ-model is graphed in FIG. 8. It is observed that the probability is zero for $\pi_S \leq \beta_S$, approximately zero for $\beta_S < \pi_S \leq \alpha_S$, and increasing in phase-transition style with the increase of seller's profits. The resulting probability converges towards Γ, the probability that one person commits fraud regardless of payout. This convergence is typical for any practical range of prices over $\pi_S$-$\alpha_S$.

Interestingly, the foregoing γ-model does not consider the counts of positive and negative responses from previous customers, nor any topology analysis of the transaction graph G. It does not need to. The fact that seller's existence in the market is reduced and accurately presented with only two parameters, α and β, renders other details about previous transactions, such as structure of the reputation tree, irrelevant. The fact is that a fraudulent seller has only one objective—to maximize profits during his existence in the on-line market. In most realistic scenarios this objective is amended to the desire to slip past detectors that would trigger criminal investigation. From that point of view, the only statistic which is crucial is the probability that, given a specific payout, the seller decides to fool his or her current buyers.

It is noted that not all sellers are equal and some form of seller classification could be employed. For example, sellers coming from places with drastically different income levels could have different financial motives to commit a fraudulent transaction. Considering these facts, it is more realistic to expect that sellers are classified to fit different behavioral models. Based upon a seller's classification, the manager of the on-line consumer market would select an appropriate γ-model and present it to prospective buyers.

Users who chose to employ time-sharing of their transaction costs would use the γ-model in the same fashion as conservative sellers who do not employ time-sharing of their transaction costs. In the time-sharing case, the risk is not only exhibited by the buyer but by the collaborating sellers as well. To issue a warning to a prospective buyer about the additional risk, he or she could be shown both the conservative and the time-shared a quantifier. Then, the buyer, fully informed, can assess the true risk and proceed with the pricing.

2.0 The Computing Environment

A brief, general description of a suitable computing environment in which portions of the seller's reputation technique embodiments described herein may be implemented will now be described. The seller's reputation technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 9:
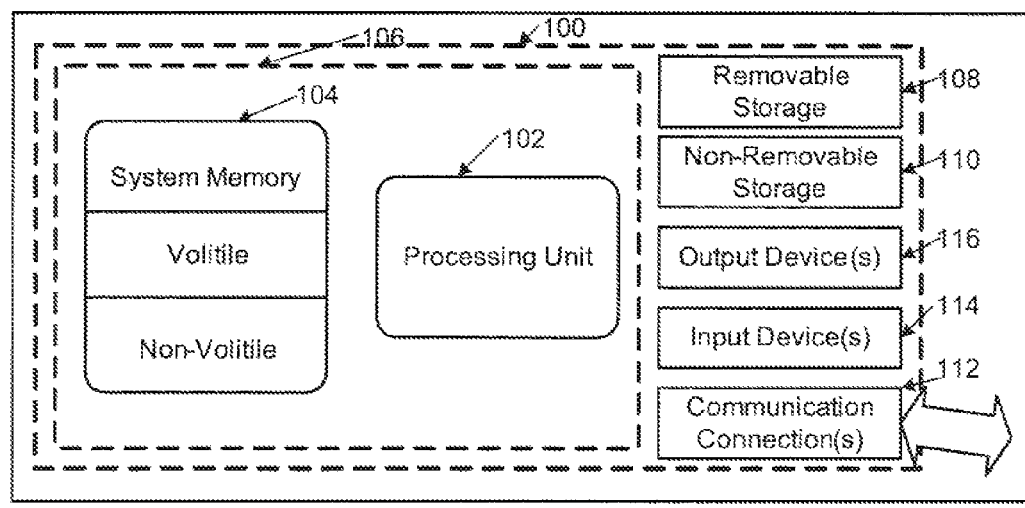
FIG. 9 is a diagram depicting a general purpose computing device constituting an exemplary system for implementing seller's reputation quantification technique embodiments described herein.

FIG. 9 illustrates an example of a suitable computing system environment. The computing system environment is only one example of a suitable computing environment and is not intended to suggest any limitation as to the scope of use or functionality of seller's reputation technique embodiments described herein. Neither should the computing environment be interpreted as having any dependency or requirement relating to any one or combination of components illustrated in the exemplary operating environment. With reference to FIG. 9, an exemplary system for implementing the embodiments described herein includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 9 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 9 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Device 100 may also have input device(s) 114 such as keyboard, mouse, pen, voice input device, touch input device, camera, etc. Output device(s) 116 such as a display, speakers, printer, etc. may also be included. All these devices are well know in the art and need not be discussed at length here.

The seller's reputation technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for providing a potential buyer of a product or service from a seller in an on-line consumer market a monetary sales limit associated with the seller, comprising using a computer to perform the following process actions:
assigning a weight to each completed transaction between the seller and each buyer previously purchasing a product or service from the seller, said weight comprising at least a portion of an overhead expense incurred by the seller from the transaction if the previous buyer was satisfied with the purchase based on positive feedback from the previous buyer associated with the transaction, and comprising the negative of the amount paid by the previous buyer if that buyer was not satisfied with the purchase;
summing all the assigned transaction weights associated with the seller and adding an amount of a reimbursement fund provided by the seller, to compute said monetary sales limit for the seller;
providing the monetary sales limit computed for the seller to the potential buyer, said monetary sales limit being usable by the potential buyer in assessing a risk of dissatisfaction with the purchase of a product or service from the seller in view of a price the buyer wants to pay for the product or service.

2. The process of claim 1, wherein the process action of adding the amount of the reimbursement fund provided by the seller, comprises an action of adding zero if no amount has been provided.

3. The process of claim 1, wherein a manager associated with the on-line consumer market receives payment from a buyer purchasing a product or service from a seller and after deducting management fees from the received payment transfers the remaining proceeds to the seller, and wherein said overhead expense incurred by the seller comprises the deducted management fees and other expenses incurred by the seller as part of the transaction which are verifiable by said manager.

4. The process of claim 3, wherein said management fees comprise at least one of (i) a fee charged by the on-line consumer market for facilitating the transaction, (ii) insurance fee, (iii) taxes, (iv) shipping and handling fees when incurred by the on-line consumer market.

5. The process of claim 3, wherein said other expenses incurred by the seller as part of the transaction which are verifiable by said manager, comprise shipping and handling fees when incurred by the seller.

6. The process of claim 3, wherein the process action of assigning a weight to each completed transaction between the seller and each buyer whenever the previous buyer was not satisfied with the purchase, further comprises decreasing the weight by the amount of other expenses incurred by the seller as part of the transaction which are not verifiable by said manager.

7. The process of claim 1, wherein a previous buyer is deemed not to be satisfied with the purchase whenever the buyer provides negative feedback on the purchase, and either the seller refuses to refund the price paid by the buyer for the product or service associated with the transaction, or the transaction is being actively disputed by the buyer and seller.

8. The process of claim 7, wherein whenever a disputed transaction is resolved by the seller refunding the price paid by the buyer for the product or service associated with the transaction, the transaction is deemed to be void and not used in the computation of the monetary sales limit for the seller.

9. The process of claim 1, wherein overhead costs of a transaction in the on-line consumer market are shared between the seller and a buyer of a product or service, such that the price paid by the buyer includes the price paid for the product or service and the buyer's share of the overhead costs for the transaction, and the overhead expense incurred by the seller from the transaction does not include the portion thereof paid by the buyer.

10. The process of claim 9, wherein the portion of the overhead costs of a transaction paid by a buyer, who subsequently is a seller in the on-line consumer market for whom a monetary sales limit is being provided to a potential buyer of a product or service offered by that seller, is included in the computation of the monetary sales limit for the seller.

11. The process of claim 10, wherein the process action of including in the computation of the monetary sales limit for the seller the portion of the overhead costs of a completed transaction paid by the seller acting as a buyer in a previous transaction, comprises the actions of:
assigning a weight to the completed transaction between the seller acting as a buyer in a previous transaction and another seller in the on-line consumer market, said weight comprising the portion of the overhead costs incurred by the seller from the transaction; and
including the weights assigned to the completed transaction between the seller acting as a buyer in the previous transaction whenever performing the process action of summing all the assigned transaction weights associated with the seller.

12. A computer-implemented process for quantifying in monetary terms a risk of dissatisfaction to a potential buyer of a product or service from a seller in an on-line consumer market, comprising using a computer to perform the following process actions:
computing a monetary sales limit for the seller, said monetary sales limit representing a monetary amount which if a sum of the current prices of all the products and services currently offered by the seller in the on-line consumer market is equal to or less than the monetary amount, there is not a significant risk to the buyer of being dissatisfied with the product or service, wherein the current prices of all the products and services currently offered by the seller are summable values;
assessing a risk of dissatisfaction to the buyer with a product or service purchased from the seller in the on-line consumer market in view of a price the buyer wants to pay for the product or service based in part on the monetary sales limit; and providing one or more indicators of said assessed risk of dissatisfaction to the potential buyer.

13. The process of claim 12, wherein the seller's monetary sales limit comprises a reimbursement fund, wherein the amount of said reimbursement fund is provided by the seller to a manager associated with the on-line consumer market, and whenever a buyer of a product or service from the seller is not satisfied with the purchase and the seller refuses to refund the amount paid by the dissatisfied buyer and the seller will not participate in a dispute resolution proceeding, the manager refunds the amount paid by the dissatisfied buyer from the seller's reimbursement fund up to a current amount of the fund.

14. The process of claim 13, wherein the process action of assessing the risk of dissatisfaction to the buyer with a product or service purchased from the seller in the on-line consumer market in view of a price the buyer wants to pay for the product or service, comprises deeming the risk of dissatisfaction to be zero whenever the seller's reimbursement fund amount equals or exceeds the seller's current prices sum.

15. The process of claim 13, wherein the process action of assessing the risk of dissatisfaction to the buyer with a product or service purchased from the seller in the on-line consumer market in view of a price the buyer wants to pay for the product or service, comprises deeming the risk of dissatisfaction to be minimal whenever the seller's monetary sales limit equals or exceeds the seller's current prices sum.

16. The process of claim 13, wherein the process action of assessing the risk of dissatisfaction to the buyer with a product or service purchased from the seller in the on-line consumer market in view of a price the buyer wants to pay for the product or service, comprises deeming the risk of dissatisfaction to be directly proportional to the amount the seller's monetary sales limit falls below the seller's current prices sum.

17. The process of claim 16, further comprising an action of, whenever the seller's monetary sales limit falls below said current prices sum, suggesting to the buyer making an offer for the product or service that the offer be made contingent on the seller increasing the seller's reimbursable fund by an amount which causes the seller's monetary sales limit to equal or exceed the seller's current prices sum.

18. The process of claim 13, wherein the process action of providing one or more indicators of said assessed risk of dissatisfaction to the potential buyer, comprises providing the sum of the current prices of all the products and services currently offered by the seller in the on-line consumer market, the seller's monetary sales limit and the current amount of the seller's reimbursement fund.

19. A computer-implemented process for providing a potential buyer of a product or service from a seller in an on-line consumer market a monetary sales limit associated with the seller, comprising using a computer to perform the following process actions:

computing a sales limit component for the seller for each completed transaction between the seller and all previous participants in the on-line consumer market from whom the seller either previously purchased a product or service from or sold a product or service to, said computation comprising for each completed transaction,
identifying the previous participant in the transaction under consideration,
computing a sum of the current prices of all the products and services currently offered by the identified previous participant, wherein the current prices of all the products and services currently offered by the identified previous participant are summable values,
computing a lower bound sales limit for the identified previous participant, said lower bound sales limit representing the sum of, for all transactions in the on-line consumer market except the one under consideration in which the identified previous participant was a party to and an agreement was made among the parties involved in the transaction to share a sales limit component associated with the transaction,
the lesser of one-half of an overhead expense associated with the transaction, and a currently available portion of the overhead expense associated with the transaction if the buyer in the transaction was satisfied with the purchase based on positive feedback from the buyer, and
the negative of the amount paid by the buyer associated with the transaction if that buyer was not satisfied with the purchase,
designating the seller's sales limit component for the transaction under consideration to be the overhead expense associated with the transaction under consideration if the identified previous participant's current prices sum less the lower bound sales limit, is less than or equal to zero, and if an agreement was made among the parties involved in the transaction to share a sales limit component associated with the transaction and the buyer in the transaction was satisfied with the purchase based on positive feedback from the buyer,
designating the seller's sales limit component for the transaction under consideration to be one-half the overhead expense associated with the transaction under consideration if the identified previous participant's current prices sum less the lower bound sales limit, is greater than or equal to one-half the overhead expense associated with the transaction under consideration, and if an agreement was made among the parties involved in the transaction to share a sales limit component associated with the transaction and the buyer in the transaction was satisfied with the purchase based on positive feedback from the buyer,
designating the seller's sales limit component for the transaction under consideration to be one-half the overhead expense associated with the transaction under consideration minus the identified previous participant's current prices sum less the lower bound sales limit, if the identified previous participant's current prices sum less the lower bound sales limit is greater than zero and less than one-half the overhead expense associated with the transaction under consideration, and if an agreement was made among the parties involved in the transaction to share a sales limit component associated with the transaction and the buyer in the transaction was satisfied with the purchase based on positive feedback from the buyer,
designating the seller's sales limit component for the transaction under consideration to be the overhead expense associated with the transaction under consideration if no agreement was made among the parties involved in the transaction to share a sales limit component associated with the transaction, the seller for which the sales limit component is being computed was the seller in the transaction under consideration and the buyer in the transaction was satisfied with the purchase based on positive feedback from the buyer, and designating the seller's sales limit component for the transaction under consideration to be the negative of the amount paid by the buyer in the transaction if the seller for which the sales limit component is being computed was the seller in the transaction under consideration and the buyer was not satisfied with the purchase;

summing all the seller's computed sales limit components and adding the amount of a reimbursement fund provided by the seller, to compute an unadjusted monetary sales limit for the seller;

whenever a sum of the current prices of all the products and services currently offered by the seller in the on-line consumer market is greater than the seller's computed unadjusted monetary sales limit, adjusting the seller's unadjusted monetary sales limit by adding unused monetary sales limit amounts currently available from previous participants in the on-line consumer market to whom the seller either previously purchased a product or service from or sold a product or service to and with whom the seller has an agreement to share a sales limit component associated with the purchase or sale, until the seller's current prices sum is less than or equal to the seller's adjusted monetary sales limit or all said currently available unused monetary sales limit amounts are exhausted, and designating the adjusted monetary sales limit to be the seller's finalized monetary sales limit;

whenever the sum of the current prices of all the products and services currently offered by the seller in the on-line consumer market is less than or equal to the seller's computed unadjusted monetary sales limit, designating the unadjusted monetary sales limit to be the seller's finalized monetary sales limit;

providing the finalized monetary sales limit computed for the seller to the potential buyer, said monetary sales limit being usable by the potential buyer in assessing a risk of dissatisfaction with the purchase of a product or service from the seller in view of a price the buyer wants to pay for the product or service.

20. The process of claim 19, wherein the process action of adjusting the seller's unadjusted monetary sales limit, comprises an action of uniformly and incrementally adjusting the seller's unadjusted monetary sales limit, wherein the uniform and incremental adjustment comprises:

(a) adding a pre-computed amount of the currently available unused monetary sales limit from each of said previous participants to the unadjusted monetary sales limit, or a last produced candidate adjusted monetary sales limit instead if one exists, to produce a current candidate adjusted monetary sales limit for the seller;

(b) determining if the seller's current prices sum is less than or equal to the seller's current candidate adjusted monetary sales limit;

(c) determining if the currently available unused monetary sales limit amount of all the previous participants is exhausted, (d) repeating actions (a) through (c), whenever it is determined that the seller's current prices sum is greater than the seller's current candidate adjusted monetary sales limit and the currently available unused monetary sales limit amount of all the previous participants is not yet exhausted; and (e) designating the current candidate adjusted monetary sales limit to be the seller's adjusted monetary sales limit whenever it is determined that the seller's current prices sum is less than or equal to the seller's last-produced candidate adjusted monetary sales limit, or the currently available unused monetary sales limit amount of all the previous participants is exhausted.

\* \* \* \* \*